United States Patent
Liu et al.

(10) Patent No.: US 11,827,078 B2
(45) Date of Patent: Nov. 28, 2023

(54) SAFETY PROTECTION METHOD BASED ON NEW ENERGY AUTOMOBILE VEHICLE-MOUNTED AIR CONDITIONER, AND SYSTEM THEREOF

(71) Applicant: SHANGHAI HONGYAO ELECTRONIC LABORATORY CO., LTD., Shanghai (CN)

(72) Inventors: Qi Liu, Shanghai (CN); Danting Jin, Shanghai (CN); Miao Chen, Shanghai (CN); Lianping Zhuang, Shanghai (CN)

(73) Assignee: SHANGHAI HONGYAO ELECTRONIC LABORATORY CO., LTD., Shanghai (CN)

( * ) Notice: Subject to any disclaimer, the term of this patent is extended or adjusted under 35 U.S.C. 154(b) by 137 days.

(21) Appl. No.: 17/475,332

(22) Filed: Sep. 14, 2021

(65) Prior Publication Data

US 2022/0001722 A1 Jan. 6, 2022

Related U.S. Application Data

(63) Continuation of application No. PCT/CN2020/078333, filed on Mar. 7, 2020.

(30) Foreign Application Priority Data

Mar. 15, 2019 (CN) .......................... 201910199601.2

(51) Int. Cl.
*B60H 1/00* (2006.01)

(52) U.S. Cl.
CPC ..... *B60H 1/00964* (2013.01); *B60H 1/00742* (2013.01); *B60H 1/00778* (2013.01)

(58) Field of Classification Search
CPC ............ B60H 1/00964; B60H 1/00742; B60H 1/00778; B60H 1/00978; G08B 21/22; G08B 21/24
See application file for complete search history.

(56) References Cited

U.S. PATENT DOCUMENTS 8,232,874 B1    7/2012 Aneiros et al.
9,227,484 B1 *  1/2016 Justice ............... B60H 1/00778
(Continued)

FOREIGN PATENT DOCUMENTS

CN    105389944       3/2016
CN    106934989 A     7/2017
(Continued)

*Primary Examiner* — Nelson J Nieves
*Assistant Examiner* — Matthew John Moscola
(74) *Attorney, Agent, or Firm* — COOPER LEGAL GROUP, LLC

(57) ABSTRACT

A safety protection method based on a vehicle-mounted air conditioner of a new energy vehicle, including: detecting a running state of the vehicle; if the vehicle stops running, performing human body detection; when a person is detained in the vehicle, detecting a staying time of the person detained in the vehicle; after the staying time exceeds a reasonable time, alerting an associated contact person that the detention person is left behind in the vehicle, and simultaneously performing temperature monitoring, time monitoring and power monitoring. A safety protection system based on a vehicle-mounted air conditioner is also disclosed.

8 Claims, 6 Drawing Sheets

(56) References Cited

U.S. PATENT DOCUMENTS

| | | | | |
|---|---|---|---|---|
| 9,758,016 B1* | 9/2017 | Baron | ............... | B60H 1/008 |
| 10,074,263 B1 | 9/2018 | Garcia et al. | | |
| 2016/0103111 A1* | 4/2016 | Griffin | ............... | B60N 2/002 |
| | | | | 73/25.01 |
| 2017/0240022 A1* | 8/2017 | Ireri | ............... | A61B 5/01 |
| 2018/0244129 A1* | 8/2018 | Whitens | ............... | G01J 5/0037 |
| 2018/0370431 A1* | 12/2018 | Wincek | ............... | B60H 1/00757 |
| 2019/0232818 A1* | 8/2019 | Gangu | ............... | B60N 2/002 |
| 2020/0139852 A1* | 5/2020 | Gao | ............... | B60N 2/002 |
| 2021/0331585 A1* | 10/2021 | Chen | ............... | B60K 35/00 |

FOREIGN PATENT DOCUMENTS

| | | | |
|---|---|---|---|
| CN | 107650853 A | | 2/2018 |
| CN | 207481818 U | | 6/2018 |
| CN | 108394374 | | 8/2018 |
| CN | 108549282 | | 9/2018 |
| CN | 109895597 | | 6/2019 |
| JP | 2002063668 A | | 2/2002 |
| JP | 2016507792 A | | 3/2016 |
| JP | 2017218032 A | * | 12/2017 |
| JP | 2017218032 A | | 12/2017 |
| KR | 101948249 | | 2/2019 |

\* cited by examiner

SAFETY PROTECTION METHOD BASED ON NEW ENERGY AUTOMOBILE VEHICLE-MOUNTED AIR CONDITIONER, AND SYSTEM THEREOF

CROSS-REFERENCE TO RELATED APPLICATION

The present application is a continuation of international application of PCT application No. PCT/CN2020/078333 filed on Mar. 7, 2020, which claims the priority benefit of China application No. 201910199601.2 filed on Mar. 15, 2019. The entirety of the above-mentioned patent applications is incorporated herein by reference and made a part of this specification.

TECHNICAL FIELD

The present application relates to the technical field of vehicle safety protection, and more particularly, to a safety protection method based on a vehicle-mounted air conditioner of a new energy vehicle and a system thereof.

BACKGROUND

With the development of society, vehicles gradually enter thousands of households and become an indispensable means of transportation for people to travel. However, a car parked in the burning sun often tends to become an "oven" and if a child is inadvertently left in the car, the consequences are unimaginable.

The existing vehicle safety protection method mostly adopts the way that the system automatically opens a vehicle window, and avoids the high temperature in the car from endangering the life safety of children through ventilation, and at the same time, it is convenient for passersby to provide assistance.

In the prior art, when in use, the system automatically opens the window, the passersby can conveniently rescue children, but the property loss in the vehicle is easily caused, and the use is inconvenient.

SUMMARY

In view of the above problems existing in the prior art, an object of the present application is to provide a safety protection method based on a vehicle-mounted air conditioner of a new energy vehicle and a system thereof, which can ensure the life safety of a child left behind and also can avoid the property loss in the vehicle.

In order to achieve the above objects, the present application provides the following technical solutions.

A safety protection method based on a vehicle-mounted air conditioner of a new energy vehicle includes the following steps:
 detecting an operating state of the vehicle;
 determining whether the vehicle stops operating;
 if the vehicle stops operating, performing a human body detection and sending a person staying signal;
 when a person stays in the vehicle, detecting a staying time for the person staying in the vehicle; and
 when the staying time exceeds a reasonable time, informing an associated contact person that there is a person stayed in the vehicle, and simultaneously performing temperature monitoring, time monitoring and power monitoring.

With the above technical solutions, in the stopped state of the vehicle, it is detected whether a person is stayed in the vehicle, and it is determined whether the person is trapped according to the staying time of the person; if a child is trapped in the vehicle, an associated contact person is notified with a staying prompt for rescue; the temperature in the vehicle is controlled by the temperature monitoring, so that damage to the trapped child caused by the temperature discomfort in the vehicle can be avoided, in the meantime of ensuring life safety of the detained child, the property loss in the vehicle is also avoided.

Further, the temperature monitoring includes the following steps:
 presetting an alerting temperature range, a warning temperature range and an alarm temperature range;
 detecting and acquiring an in-vehicle temperature;
 determining whether the in-vehicle temperature is within the alerting temperature range, and if the in-vehicle temperature is within the alerting temperature range, alerting the associated contact person to start the in-vehicle air conditioner;
 determining whether the in-vehicle temperature is within the warning temperature range, and if the in-vehicle temperature is within the warning temperature range, automatically starting the vehicle-mounted air conditioner, and informing the associated contact person that the air conditioner has been started;
 determining whether the in-vehicle temperature is within the alarm temperature range, and if the in-vehicle temperature is within the alarm temperature range, issuing, by the vehicle, an alarm and calling police and simultaneously notifying the associated contact person.

With the above technical solutions, according to the detected in-vehicle temperature, the level of the current temperature is determined, and at the alerting level, the associated contact person is alerted to turn on the vehicle-mounted air conditioner; at the warning level, the vehicle-mounted air conditioner is automatically started for adjusting the in-vehicle temperature; at the alarm level, an alarm is issued to ask for providing assistance and meanwhile the vehicle issues an alarm and calls the police.

Further, the method further includes:
 determining whether the air conditioner is normally operated, and if the air conditioner is normally operated, notifying the associated contact person that the air conditioner is started normally; if the air conditioner is not normally operated, notifying the associated contact person that the air conditioner is started abnormally; and
 determining whether the in-vehicle temperature is significantly improved, and if the in-vehicle temperature is significantly improved, alerting the associated contact person that the air conditioner has a poor effect.

With the above technical solutions, it is ensured that the air conditioner can work normally, and under the condition that the air conditioner breaks down, a reminder is sent to the associated contact person.

Further, the time monitoring includes the following steps:
 presetting a prompt time, a warning time and an alarm time;
 determining whether the staying time reaches the prompt time, and if the staying time reaches the prompt time, notifying the associated contact person that a person is stayed in the vehicle for a too long time;
 determining whether the staying time reaches the warning time, and if the staying time reaches the warning time, notifying the associated contact person that an alarm is about to be issued; and determining whether the staying time reaches the alarm time, and if the staying time reaches the alarm time, issuing, by the vehicle, an alarm and calling the police, and notifying an associated contact person.

With the above technical solutions, the staying time of the detained person is also classified according to the levels, within the warning time, only prompting the associated contact person that the person is detained in the vehicle for a long time; if the staying time is longer, warn the associated contact person that the vehicle body is about to issue an alarm; when the staying time reaches the alarm time, the vehicle issues an alarm and calls the police.

Further, the power monitoring includes the following steps:

detecting and reading a remaining power of the vehicle;

presetting a limit power, and determining whether the remaining power is lower than the limit power; and if the remaining power is lower than the limit power, prohibiting turning on the air conditioner and notifying the associated contact person of insufficient power.

With the above technical solutions, when vehicle power is insufficient, turning on the air conditioner is prohibited so as to save power for the system, so that the system can still operate normally and continue to send a message and issue an alarm.

A safety protection system based on a vehicle-mounted air conditioner of a new energy vehicle includes:

a human body detection module, configured to detect whether there is a person stayed in the vehicle when the vehicle stops operating, and send a person staying signal;

a temperature detection module, configured to detect an in-vehicle temperature and send an in-vehicle temperature signal;

a control module, electrically connected with the temperature detection module and the human body detection module, and configured to perform information processing according to a preset system control logic and control operations of the modules;

an operating detection module, provided in the control module and configured to detect an operating state of the vehicle and send a state signal;

a timing module, provided in the control module and configured to start timing when the person staying signal indicates that a person is stayed in the vehicle and send a staying time signal;

a vehicle-mounted air conditioner, configured to adjust the in-vehicle temperature;

a vehicle-mounted networking module, electrically connected among the vehicle-mounted air conditioner, a vehicle body component, a power supply module and the control module, and configured to control operations of the vehicle-mounted air conditioner and the vehicle body component in response to a signal from the control module;

an air conditioner control module, provided in the control module and configured to control on-off and a temperature adjustment of the air conditioner, and monitor an operating state of the air conditioner;

an alarm module, provided in the control module and configured to issue an alarm to a public safety department via a vehicle-mounted SIM card in the vehicle-mounted networking module; control the vehicle body component via the vehicle-mounted networking module for realizing vehicle whistling and flashing; and send alarm information to an APP on the user mobile phone via a cloud server of the vehicle-mounted networking module; and a power supply module, configured to supply power to circuits in the system.

With the above technical solutions, in the stopped state of the vehicle, it is detected whether a person is stayed in the vehicle, and it is determined whether the person is trapped according to the staying time of the person; if a child is trapped in the vehicle, an associated contact person is notified with a staying prompt for rescue; the temperature in the vehicle is controlled by the temperature monitoring, so that damage to the trapped child caused by the temperature discomfort in the vehicle can be avoided, in the meantime of ensuring life safety of the detained child, the property loss in the vehicle is also avoided.

Further, the vehicle-mounted networking module data is in data connection with the cloud server, and the cloud server is in data connection with a user mobile phone module.

With the above technical solutions, the cloud server is used to connect a user mobile phone module, so that relevant in-vehicle information can be conveniently sent to the associated contact person.

Further, the system further includes: a power monitoring module, provided in the control module and configured to acquire remaining power information of the power supply module via the vehicle-mounted networking module, and send a remaining power signal to the control module.

With the above technical solutions, the monitoring module detects the power of the vehicle body, and when the power is low, the monitoring module reminds the associated contact person that the power is insufficient and closes the air conditioner, so as to save the power and enable the system to run normally.

Further, the human body detection module is achieved with one or more of following manners: infrared rays, ultrasonic waves, microwaves, image recognition, and gravity detection.

By the above technical solutions, the accuracy of human body detection is effectively improved.

Compared with the prior art, the present application can bring beneficial effects as following.

(1) If a child is trapped in a stopped vehicle, the in-vehicle temperature is adjusted by means of the temperature monitoring and the person staying informing, for providing a comfortable survival environment and gaining time for rescue of the child. In this way, the associated contact person can timely rescue the trapped child, and avoiding property loss in the vehicle while ensuring the life safety of the detained child.

(2) The in-vehicle temperature is classified into different levels, so as to correspondingly perform prompting of starting the vehicle-mounted air conditioner, automatically starting the vehicle-mounted air conditioner and issuing an alarm, which has a high practicability.

(3) Further, the normal operation of the vehicle-mounted air conditioner is ensured by detecting the operation of the vehicle-mounted air conditioner. When the air conditioner fails or the cooling/heating effect is poor, a message is sent to the associated contact person to notify the associated contact person of the fault of the vehicle-mounted air conditioner.

DESCRIPTION OF THE EMBODIMENTS

In order to make the objects, technical solutions and beneficial effects of the present application clearer, the present application will be further described in detail below with reference to the embodiments and accompanying drawings, but the embodiments of the present application are not limited thereto.

Figure 1:
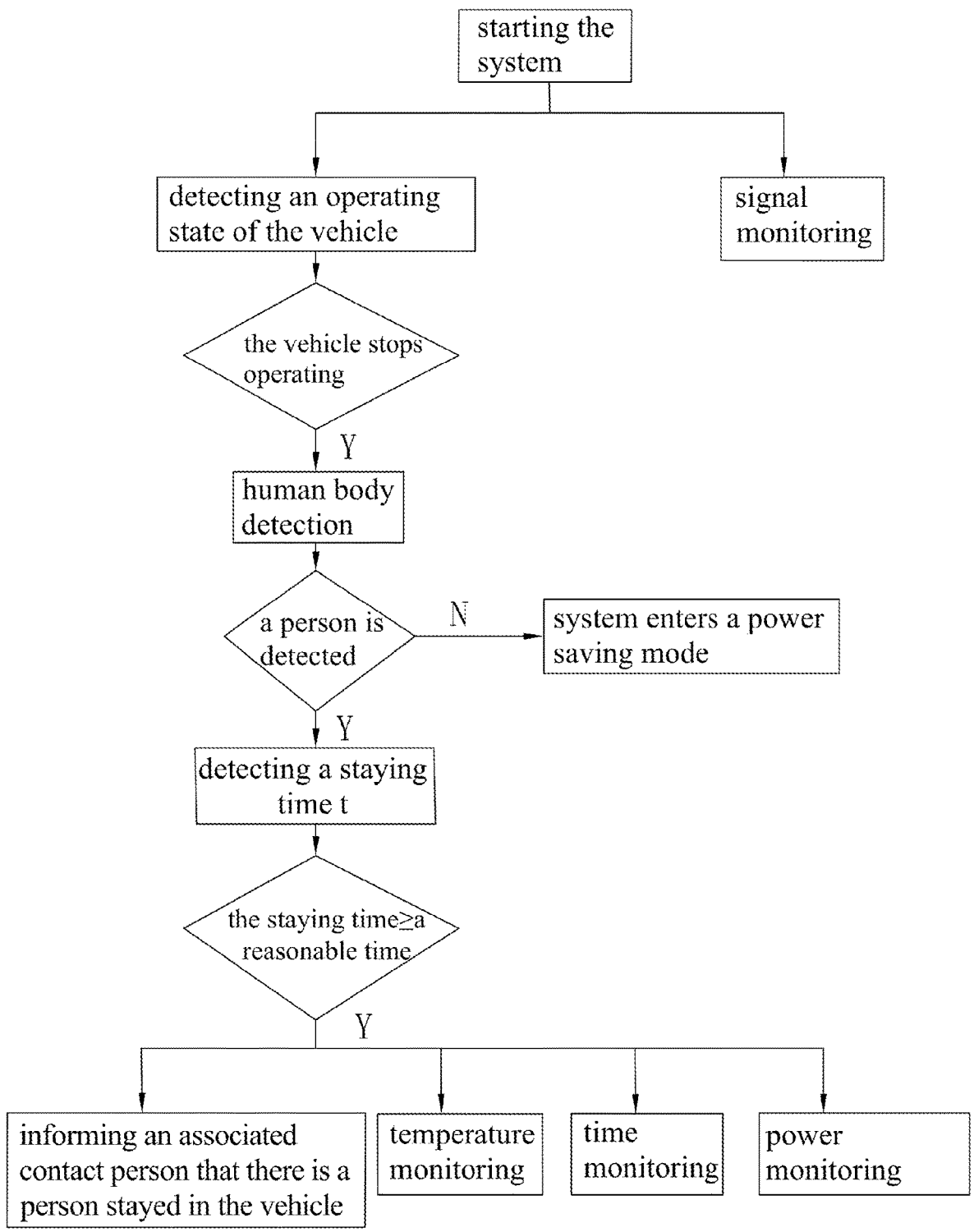
FIG. 1 is an overall flow chart of a method according to the present application.

As shown in FIG. 1, a safety protection method based on a vehicle-mounted air conditioner of a new energy vehicle includes the following steps:

detecting an operating state of a vehicle and sending a state signal;

determining whether the vehicle stops operating in response to the state signal;

if the vehicle stops operating, performing a human body detection to detect whether a person stays in the vehicle when the vehicle is in a stopped operating state, and sending a person staying signal to output a detection result;

acquiring the detection result in response to the person staying signal, if a person stays in the vehicle, detecting a staying time for the person in the vehicle and sending a staying time signal;

reading the staying time signal, and acquiring a staying time t for the person in the vehicle, when the staying time t exceeds a reasonable time, informing an associated contact person that there is a person stayed in the vehicle, and simultaneously performing temperature monitoring, time monitoring and power monitoring, wherein the reasonable time is used for a user to pick up belongings in the vehicle and prepare for getting off the vehicle, which belongs to a reasonable staying time.

In particular, the informing of a person staying is used to inform the associated contact person that there is a person stayed in the vehicle for a long time when the vehicle is in a stopping state. The temperature monitoring is used to adjust the temperature in the vehicle, thereby preventing children trapped in the car from being injured due to the temperature in the car being too high or too low. The time monitoring is used to monitor the staying time for the person stayed in the vehicle, and raise an alarm after the child has been trapped in the vehicle for a long time. The power monitoring is used to monitor the power of the vehicle, and if the remaining power is lower than a limit power, prohibiting turning on the air conditioner to ensure that the remaining power in the car is sufficient for the normal operation of the system except for the air conditioner.

Figure 2:
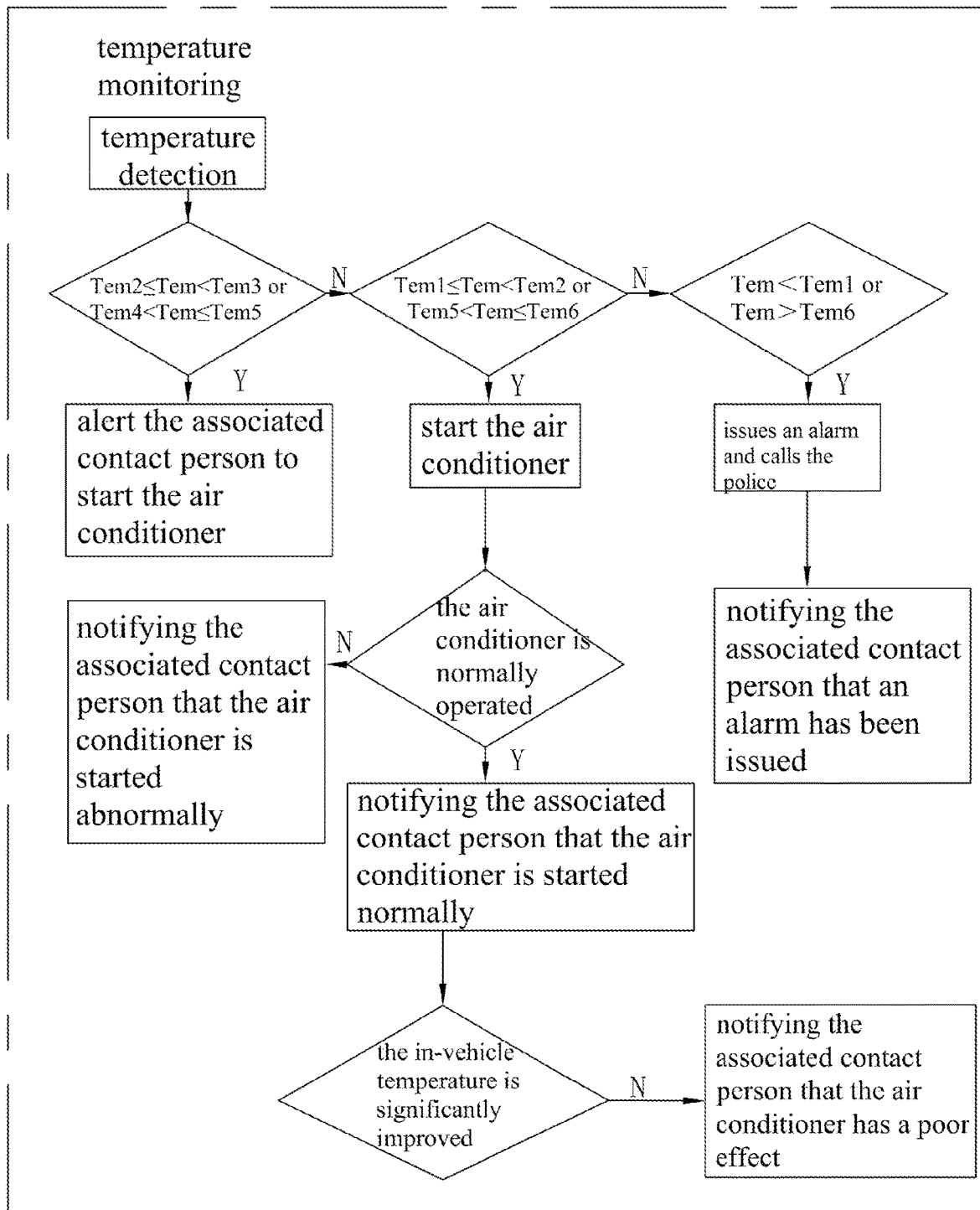
FIG. 2 is a flow chart of temperature monitoring according to the present application.

As shown in FIG. 2, the temperature monitoring includes the following steps:

presetting an alerting temperature range (Tem2-Tem3 and Tem4-Tem5), a warning temperature range (Tem1-Tem2 and Tem5-Tem6) and an alarm temperature range (>Tem6 and <Tem1), wherein Tem1<Tem2<Tem3<Tem4<Tem5<Tem6, and for example, Tem1 is 0° C., Tem2 is 5° C., Tem3 is 10° C., Tem4 is 25° C., Tem5 is 30° C., Tem6 is 35° C.;

detecting and acquiring an in-vehicle temperature;

determining whether the in-vehicle temperature is within the alerting temperature range, which is an uncomfortable temperature range for in-vehicle, and if the in-vehicle temperature is within the alerting temperature range, alerting the associated contact person to manually start the in-vehicle air conditioner to adjust the in-vehicle temperature;

determining whether the in-vehicle temperature is within the warning temperature range, which is a temperature range where it is difficult for the stayed person to survive in the vehicle for a long time, and if the in-vehicle temperature is within the warning temperature range, the system automatically starts the vehicle-mounted air conditioner to adjust the in-vehicle temperature, thereby effectively avoiding the child from being trapped in the vehicle with an excessively high temperature or an excessively low temperature;

determining whether the in-vehicle temperature is within the alarm temperature range, which is an excessively high temperature range for in-vehicle, and if the in-vehicle temperature is within the alarm temperature range, issuing an alarm to ask for help from the police, and simultaneously notifying the associated contact person that an alarm has been issued;

determining whether the air conditioner is normally started, and if the air conditioner is normally started, notifying the associated contact person that the air conditioner is started; if the air conditioner is not normally started, notifying the associated contact person that the function of the vehicle-mounted air conditioner for adjusting the temperature in the vehicle fails;

detecting whether the in-vehicle temperature is improved, and if the in-vehicle temperature is not improved, notifying the associated contact person in time that the temperature adjustment capability of the vehicle-mounted air conditioner is insufficient, such that the associated contact person returns in time for rescue.

Figure 3:
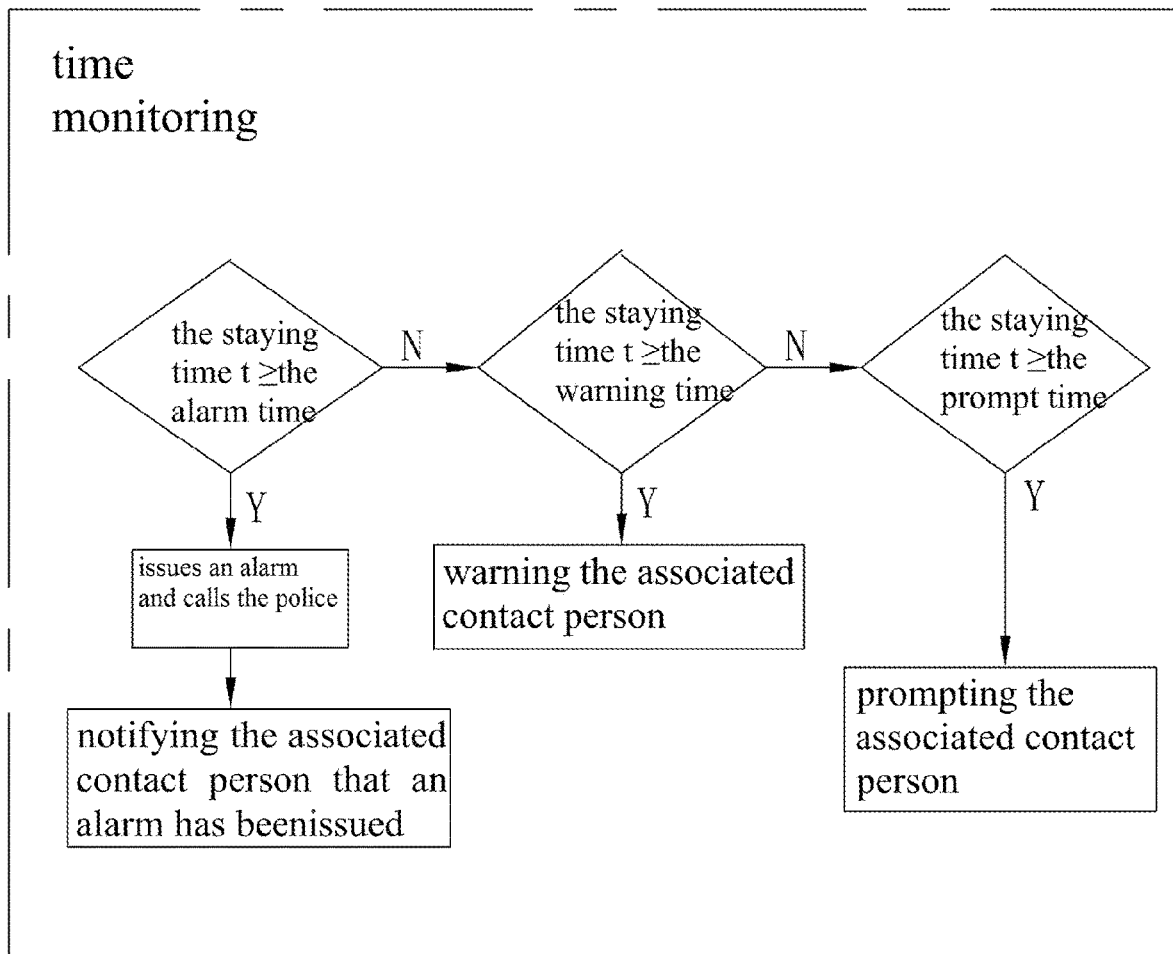
FIG. 3 is a flow chart of time monitoring according to the present application.

As shown in FIG. 3, the time monitoring includes the following steps:

presetting a prompt time, a warning time and an alarm time, wherein the prompt time<the warning time<the alarm time;

determining whether the staying time t reaches the prompt time, and if the staying time t reaches the prompt time, notifying the associated contact person that a person is stayed in the vehicle for a too long time;

determining whether the staying time t reaches the warning time, and if the staying time t reaches the warning time, notifying the associated contact person that an alarm is about to be issued, to provide a warning to the associated contact person, so that the associated contact person can return in time to cancel the warning;

determining whether the staying time t reaches the alarm time, and if the staying time t reaches the alarm time, it is indicated that the person is stayed in the vehicle for a long time, issuing an alarm to ask for help from the police, and notifying an associated contact person that an alarm has been issued.

Figure 4:
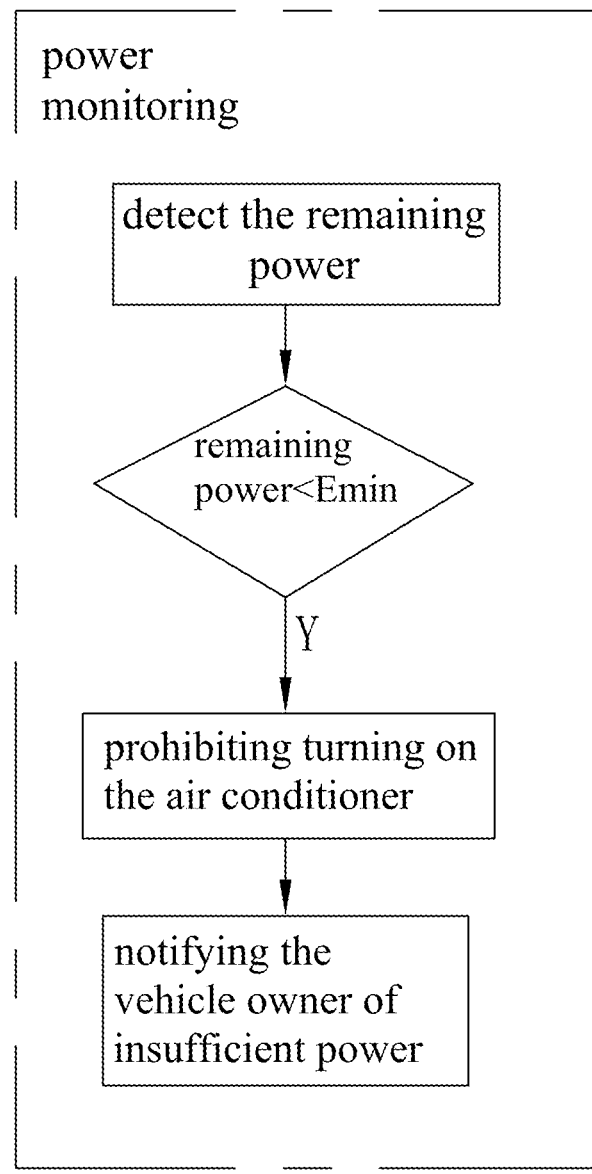
FIG. 4 is a flow chart of power monitoring according to the present application.

As shown in FIG. 4, the power monitoring includes the following steps:

detecting and reading a remaining power of the vehicle;

presetting a limit power, and determining whether the remaining power is lower than the limit power;

if the remaining power is lower than the limit power, prohibiting turning on the air conditioner so as to save power for the system, so that the system can still operate normally and continue to send a message and issue an alarm.

Figure 5:
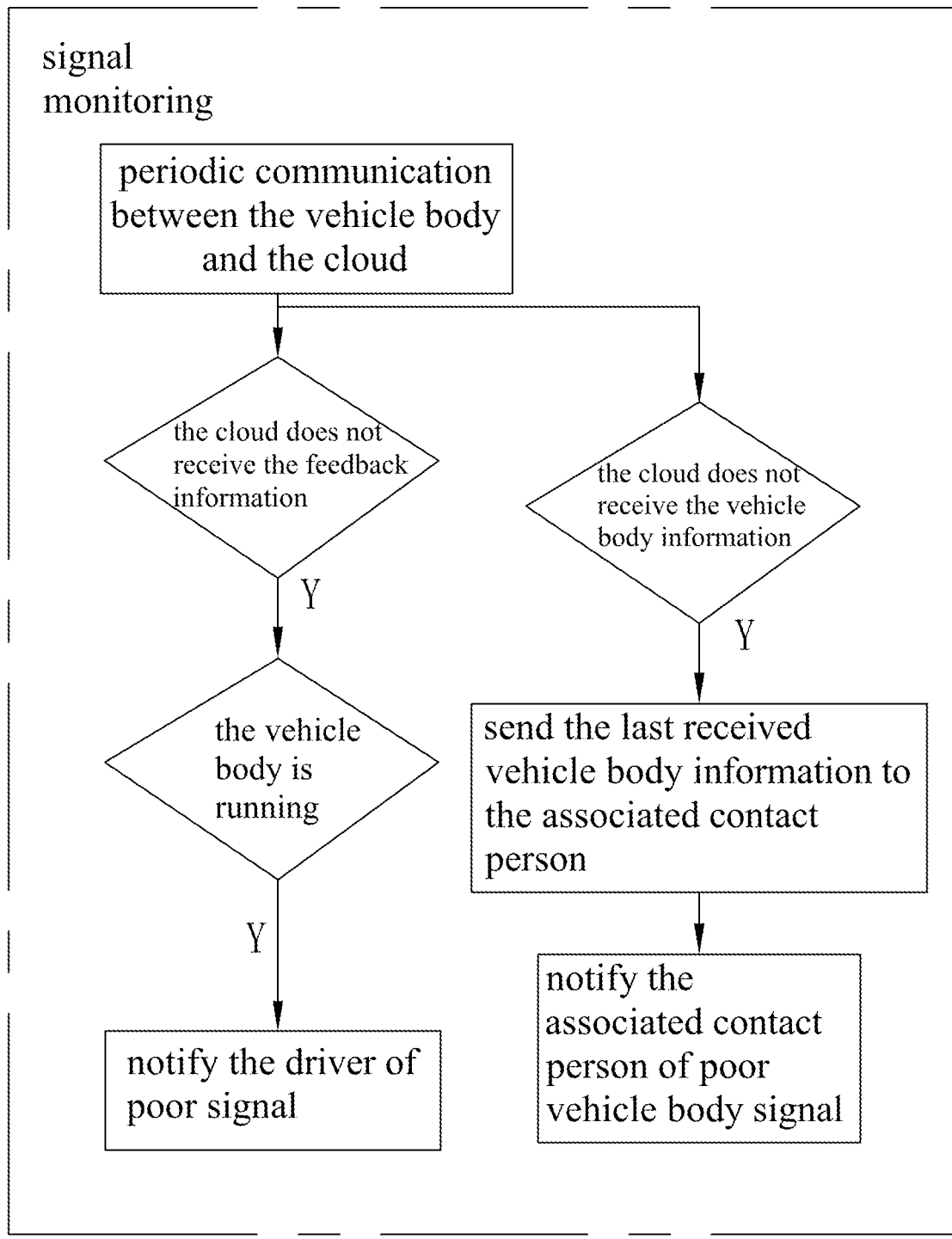
FIG. 5 is a flow chart of signal monitoring according to the present application.

As shown in FIGS. 1 and 5, the method further simultaneously performs a signal monitoring, which includes the following steps:

determining whether a communication between the vehicle body and a cloud is normal by determining a response status of a periodic communication therebetween;

if the communication between the vehicle body and the cloud is abnormal, continue to determining whether the vehicle stops operating, and if the vehicle stops operating, the cloud sending a message to the associated contact person to notify that a networking signal of the vehicle body is interfered; if the vehicle does not stop operating, prompting the driver through vehicle body signal lamp flashing, voice and the like.

Figure 6:
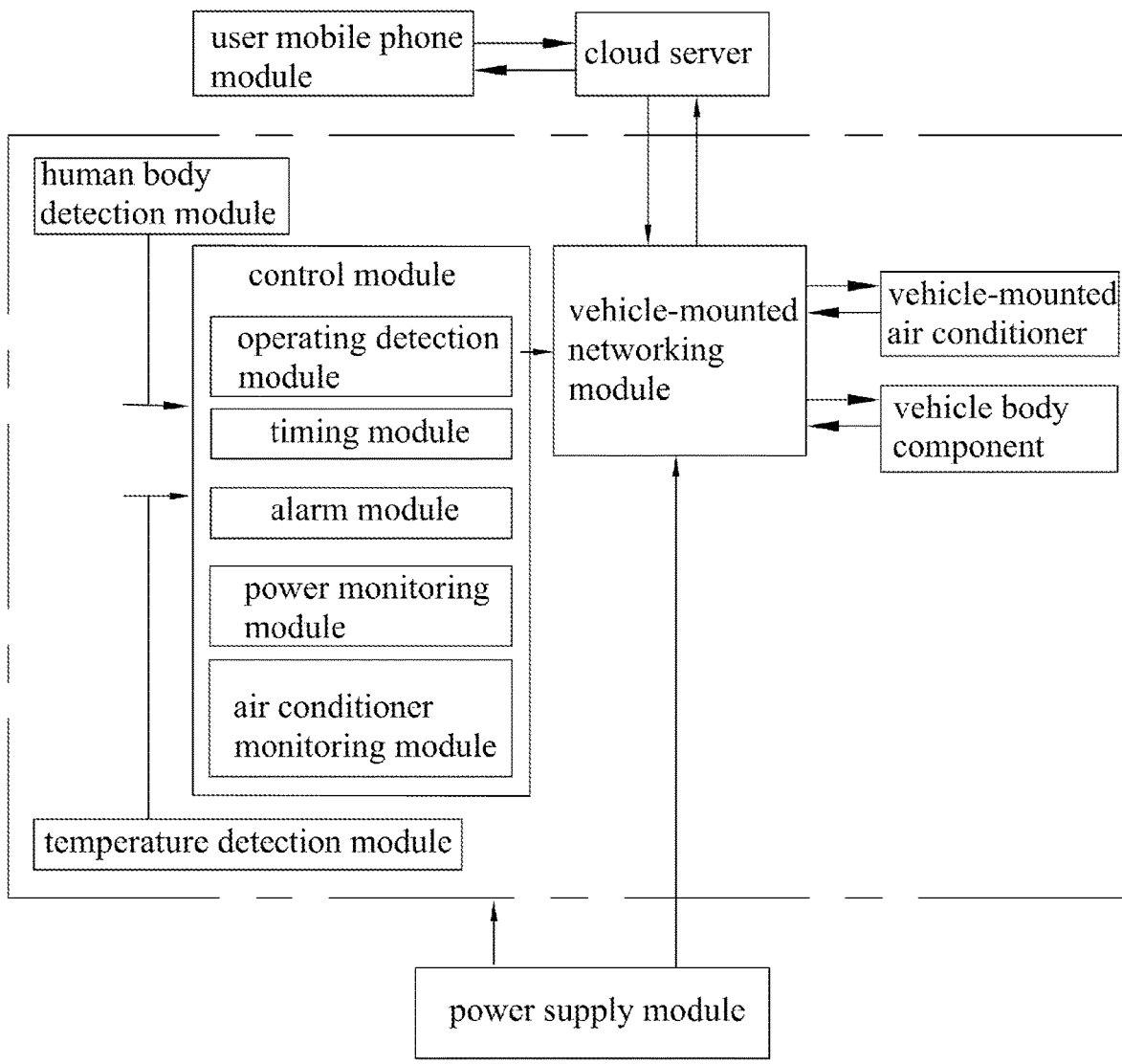
FIG. 6 is a schematic diagram of an overall structure of a system according to the present application.

As shown in FIG. 6, a safety protection system based on a vehicle-mounted air conditioner of a new energy vehicle includes an operating detection module, a human body detection module, a timing module, a temperature detection module, an air conditioner control module, a power monitoring module, a control module, vehicle-mounted networking module, a power supply module, a vehicle-mounted air conditioner, a vehicle body component and so on.

The human body detection module is configured to detect whether there is a person stayed in the vehicle when the vehicle stops operating, and send a person staying signal. The human body detection module monitors the in-vehicle situation on a full-day by using a camera with an infrared night vision function that is mounted in a suitable position in the vehicle for performing a human body image recognition. By applying an existing human body image recognition algorithm, to the human body detection module determines whether there is a person in the vehicle based on an analysis of a series of human body-related attributes, and sends the determination result to the control module. If there is a person in the vehicle, the camera will take a photograph of the vehicle at the moment, and send the photograph to the user's mobile phone when the user has a demand for viewing the in-vehicle situation at the mobile phone end. The human body detection module transfers information to the control module via Bluetooth.

The temperature detection module is configured to detect an in-vehicle temperature and send an in-vehicle temperature signal upon determining that a person is stayed in the vehicle. The temperature detection module uses non-contact temperature sensors that are arranged in many positions in the vehicle, and sends the measured temperature signal to the control module via a port for performing AD conversion processing.

The control module is electrically connected with the temperature detection module and the human body detection module, and is configured to perform information processing according to a preset system control logic and control operations of the modules. The control module adopts a single chip microcomputer in the prior art. The information transmission between the control module and the vehicle-mounted networking module is implemented via CAN communication (transmission of control information) and Bluetooth (transmission of pictures).

The timing module is provided in the control module. The timing module adopts a timer in the prior art, and is configured to start timing when the person staying signal indicates that a person is stayed in the vehicle and send a staying time signal.

The operating detection module is provided in the control module, and configured to detect an operating state of the vehicle and send a state signal. Here, in the prior art, the operating state information of the vehicle can be directly obtained from the vehicle-mounted networking module.

The vehicle-mounted networking module is electrically connected between the vehicle-mounted air conditioner and the control module, and configured to control operations of the vehicle-mounted air conditioner in response to a signal from the control module. In particular, the vehicle-mounted networking module may be a core module of a popular vehicle networking technology, for example, an intelligent vehicle-mounted terminal, i.e., Telematics BOX, abbreviated as a vehicle-mounted T-BOX, which implements communication with a background cloud service system/mobile phone APP and a vehicle information display and control function of the mobile phone APP. The vehicle-mounted T-BOX terminal is provided with a SIM card, a 4G antenna, a GPS antenna, and the like; and supports Bluetooth and WIFI communication; has an OBD module with dual-core processing, and a CPU architecture with dual-core processing; respectively collects bus data and private protocols related to vehicle buses Dcan, Bcan and Pcan for reverse control, so as to implement the transfer of instructions and information, including vehicle state information, control instructions and the like; data is transmitted to a cloud server (bidirectional communication) via a GPRS network, and vehicle body information is actively fed back to a user's mobile phone, such that a dynamic intervention is performed to avoid accidents. Based on the vehicle-mounted T-BOX terminal, the functions of actively/remotely controlling of the vehicle-mounted air conditioner, making a call, communicating with a mobile phone and the like can be realized. When the terminal is in a state of no signal network, the current information (including temperature, human body detection information, vehicle positioning, remaining power, etc.) needs to be recorded periodically, and the latest real-time information is sent to the cloud in a complementary reporting mode when the network is recovered.

The alarm module is provided in the control module, and configured to issue an alarm to a public safety department via a vehicle-mounted SIM card in the vehicle-mounted networking module, wherein the content of the alarm is preset voice alarm information (including vehicle location, vehicle model and color, license plate number and so on); and control the vehicle body component via the vehicle-mounted networking module for realizing vehicle whistling and flashing; and send alarm information to an APP on the user mobile phone via a cloud server of the vehicle-mounted networking module.

The vehicle-mounted air conditioner is configured to drive the air conditioner of the vehicle to perform a refrigeration or heating, and is in data connection with the vehicle-mounted networking module via a CAN communication network. The vehicle-mounted air conditioner receives a control instruction vie a CAN network for performing an operation of refrigeration, heating or turning off, and feeds back an operation state of the air conditioner to the control module in real time. An air conditioner control module is provided in the control module, and configured to control on-off and a temperature adjustment of the air conditioner, and monitor an operating state of the air conditioner. The operation effect of the vehicle-mounted air conditioner may be determined by analyzing the relationship between the temperature change in the vehicle and the time after the air conditioner is turned on, and the result is fed back to the user when the effect is poor.

The power supply module is configured to supply power to each circuit of the system, use a vehicle-mounted power supply as a power supply module of the system, and feedback the remaining power information of the power supply to the control module in real time. The power supply module is connected to the vehicle-mounted networking module through a CAN communication network.

The power monitoring module is provided in the control module, and configured to detect the power remaining in the power supply module, and determine the remaining power, so as to ensure that the power of the power supply module is sufficient to maintain the operation of the main function of the system and alarm.

The vehicle-mounted networking module data is in data connection with the cloud server. The cloud server is a terminal based on the vehicle-mounted T-BOX, and an information service background established by applying a cloud technology; connects the vehicle body with a mobile phone through a GPRS network for information interaction, and integrates and centrally manages user data in the background, so that the user can achieve functions, such as real-time information query and remote vehicle control. When the cloud server is disconnected with the vehicle-mounted terminal, the information received from the vehicle body for the last time is sent to the mobile phone, and the mobile phone is informed that the communication with the vehicle fails at the moment. When the cloud server is disconnected with the user's mobile phone, the information received from the vehicle body at the latest time is sent to the user's mobile phone module after the communication of the mobile phone is recovered. The APP on the user's mobile phone transmits the user's request and control command to the vehicle-mounted networking module via the cloud server and the 4G network, and the vehicle-mounted networking module transmits the request and control information to each of modules in the vehicle via the CAN network. The vehicle-mounted networking module obtains information in real time via the CAN network and other communication interfaces (Bluetooth) and uploads the information to the cloud server. The cloud server sends the information to APP on the user's mobile phone through the 4G network.

In summary, according to the present application, if a child is trapped in a stopped vehicle, the in-vehicle temperature is adjusted by means of the temperature monitoring and the person staying informing, for providing a comfortable survival environment and gaining time for rescue of the child. In this way, the associated contact person can timely rescue the trapped child, and avoiding property loss in the vehicle while ensuring the life safety of the detained child. The in-vehicle temperature is classified into different levels, so as to correspondingly perform prompting of starting the vehicle-mounted air conditioner, automatically starting the vehicle-mounted air conditioner and issuing an alarm, which has a high practicability. The normal operation of the vehicle-mounted air conditioner is ensured by detecting the operation of the vehicle-mounted air conditioner. When the air conditioner fails or the cooling/heating effect is poor, a message is sent to the associated contact person to notify the associated contact person of the fault of the vehicle-mounted air conditioner.

The above description is only preferred embodiments of the present application and is not intended to limit the protection scope of the present application. Therefore, all equivalent changes of the structure, shape or principle according to the spirit of the present application should be all included in the protection scope of the present application.

What is claimed is:

1. A safety protection method based on a vehicle-mounted air conditioner of a hybrid or electric vehicle, comprising:
   detecting an operating state of the hybrid or electric vehicle;
   determining whether the hybrid or electric vehicle stops operating;
   performing a human body detection and sending a person staying signal when the hybrid or electric vehicle stops operating;
   detecting a staying time for a person staying in the hybrid or electric vehicle when the person stays in the vehicle; and
   informing an associated contact person that there is the person staying in the hybrid or electric vehicle, and simultaneously performing temperature monitoring, time monitoring and power monitoring when the staying time exceeds a time used for a user to pick up belongings in the hybrid or electric vehicle and prepare for getting off the hybrid or electric vehicle,
   wherein the step of performing temperature monitoring comprises:
      presetting an alerting temperature range, a warning temperature range and an alarm temperature range;
      detecting and acquiring an in-vehicle temperature;
      determining whether the in-vehicle temperature is within the alerting temperature range, wherein alerting the associated contact person to start the vehicle-mounted air conditioner when the in-vehicle temperature is within the alerting temperature range;
      determining whether the in-vehicle temperature is within the warning temperature range, wherein automatically starting the vehicle-mounted air conditioner and informing the associated contact person that the vehicle-mounted air conditioner has been started when the in-vehicle temperature is within the warning temperature range; and
      determining whether the in-vehicle temperature is within the alarm temperature range, wherein issuing, by the hybrid or electric vehicle, an alarm and calling police and simultaneously notifying the associated contact person when the in-vehicle temperature is within the alarm temperature range.

2. The safety protection method based on the vehicle-mounted air conditioner of the hybrid or electric vehicle according to claim 1, further comprising:
   determining whether the vehicle-mounted air conditioner is normally operated, wherein notifying the associated contact person that the vehicle-mounted air conditioner is started normally when the vehicle-mounted air conditioner is normally operated and notifying the associated contact person that the vehicle-mounted air conditioner is started abnormally when-if the vehicle-mounted air conditioner is not normally operated; and
   determining whether the in-vehicle temperature is significantly improved, wherein alerting the associated contact person that the vehicle-mounted air conditioner has a poor effect when the in-vehicle temperature is significantly improved.

3. The safety protection method based on the vehicle-mounted air conditioner of the hybrid or electric vehicle according to claim 1, wherein the step of performing time monitoring comprises:
   presetting a prompt time, a warning time and an alarm time;
   determining whether the staying time reaches the prompt time, wherein notifying the associated contact person that the person stayed in the hybrid or electric vehicle for a too long time when the staying time reaches the prompt time;
   determining whether the staying time reaches the warning time, wherein notifying the associated contact person that an alarm is about to be issued when the staying time reaches the warning time; and
   determining whether the staying time reaches the alarm time, wherein issuing, by the vehicle, comprises issuing the alarm and calling the police and notifying the associated contact person when the staying time reaches the alarm time.

4. The safety protection method based on the vehicle-mounted air conditioner of the hybrid or electric vehicle according to claim 1, wherein the step of performing power monitoring comprises:
    detecting and reading a remaining power of the hybrid or electric vehicle;
    presetting a limit power, and determining whether the remaining power is lower than the limit power; and
    prohibiting turning on the vehicle-mounted air conditioner and notifying the associated contact person of insufficient power when4f the remaining power is lower than the limit power.

5. A safety protection system based on a vehicle-mounted air conditioner of a hybrid or electric vehicle, comprising:
    a human body detection module, configured to detect whether there is a person stayed in the hybrid or electric vehicle when the hybrid or electric vehicle stops operating, and send a person staying signal;
    a temperature detection module, configured to detect an in-vehicle temperature and send an in-vehicle temperature signal;
    a control module, electrically connected with the temperature detection module and the human body detection module, and configured to perform information processing according to a preset system control logic and control operations of the temperature detection module and the human body detection module;
    an operating detection module, provided in the control module, electrically connected with a vehicle-mounted networking module and configured to detect an operating state of the hybrid or electric vehicle and send a state signal;
    a timing module, provided in the control module and configured to start timing when the person staying signal indicates that the person is staying in the vehicle and send a staying time signal;
    a vehicle-mounted air conditioner, configured to adjust the in-vehicle temperature;
    a power supply module, configured to supply power to circuits in the safety protection system;
    the vehicle-mounted networking module, electrically connected among the vehicle-mounted air conditioner, a vehicle body component, the power supply module and the control module, and configured to control operations of the vehicle-mounted air conditioner and the vehicle body component in response to a signal from the control module;
    an air conditioner control module, provided in the control module, electrically connected with the vehicle-mounted air conditioner and configured to control on-off and a temperature adjustment of the vehicle-mounted air conditioner, and monitor an operating state of the vehicle-mounted air conditioner; and
    an alarm module, provided in the control module, electrically connected with the vehicle-mounted networking module and configured to issue an alarm to a public safety department via a vehicle-mounted subscriber identity module (SIM) card in the vehicle-mounted networking module; control the vehicle body component via the vehicle-mounted networking module for realizing vehicle whistling and flashing; and send alarm information to an application (APP) on a user mobile phone via a cloud server of the vehicle-mounted networking module,
    wherein an operation effect of the vehicle-mounted air conditioner is configured to be determined by analyzing a relationship between a temperature change in the hybrid or electric vehicle and a time after the vehicle-mounted air conditioner is turned on.

6. The safety protection system based on the vehicle-mounted air conditioner of the hybrid or electric vehicle according to claim 5, wherein the vehicle-mounted networking module data is in data connection with the cloud server, and the cloud server is in data connection with a user mobile phone module.

7. The safety protection system based on the vehicle-mounted air conditioner of the hybrid or electric vehicle according to claim 5, further comprising:
    a power monitoring module, provided in the control module, electrically connected with the power supply module and configured to acquire remaining power information of the power supply module, and send a remaining power signal to the control module.

8. The safety protection system based on the vehicle-mounted air conditioner of the hybrid or electric vehicle according to claim 5, wherein the human body detection module comprises one or a combination of infrared rays, ultrasonic waves, microwaves, image recognition, and gravity detection.

* * * * *